C. W. SALADEE.
Torsional Springs.
No. 6,205.
Reissued Jan. 5, 1875.
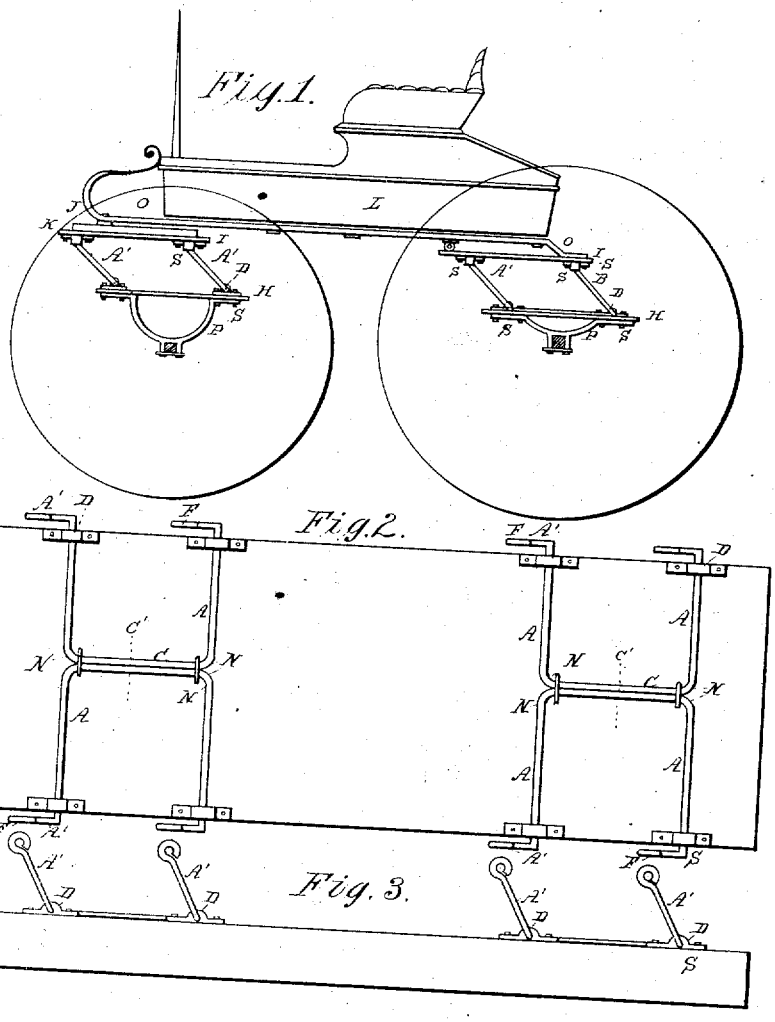
Witnesses
Herm. Lauter
P. F. Larner
Inventor
Chas. W. Saladee
THE GRAPHIC CO. PHOTO-LITH. 39 & 41 PARK PLACE, N.Y.

UNITED STATES PATENT OFFICE.

CYRUS W. SALADEE, OF PITTSBURG, ASSIGNOR TO LEANDER DOBBINS, OF ERIE, PENNSYLVANIA.

IMPROVEMENT IN TORSIONAL SPRINGS.

Specification forming part of Letters Patent No. 113,451, dated April 4, 1871; reissue No 6,205, dated January 5, 1875; application filed October 14, 1874.

*To all whom it may concern:*

Be it known that I, CYRUS W. SALADEE, of Pittsburg, in the county of Allegheny and State of Pennsylvania, have invented certain Improvements in Torsional Springs, of which the following is a specification embodying my invention:

The nature of my invention consists of U-shaped torsional springs, rigidly secured at or near their corners, that the strain may be divided and secure a more permanent means of holding the central portion of the spring in its required position.

In the accompanying drawings, Figure 1, Sheet 1, represents a side elevation of a buggy embracing my invention; Fig. 2, Sheet 2, a view showing more fully the construction of my spring; and Fig. 3, a side view thereof.

The spring shown is both practical and serviceable, owing to the peculiar form given to the central portion of the steel rod of which the spring is made. In Fig. 2 it will be seen that the central portion, C, of the spring is bent in the form of a square U, having two short bends, N. The advantage arising from this form consists in securing a greater purchase between the rods A, at C′, against the pressure imposed upon the outer ends, F, of the levers A′. And this form also admits of separating the rod at the center point indicated by the dotted line C′, and the ends at that point held down by a wide clip or other suitable fastening, and thus facilitate the repairing of the spring in case either prong of the U is broken.

Experience has demonstrated the fact that in all cases where there is but one bend in the central portion of the rod the entire strain of both prongs, A and A, is concentrated at this single bend, and at which point this form of spring is sure to break after a little use. But bend the rod in the form of a square U, substantially as seen in Fig. 2, and each prong A acts upon the turned corner N independent of the opposite prong, and thereby preventing that concentration of strain of both prongs at one point of the steel as in the other case.

Besides, this form of torsional spring is found to be more extensively applicable for all purposes where such springs are required than those with the single bend at their centers, while at the same time they are safer, stronger, and more reliable in use.

I claim as my invention—

The U-shaped torsional springs A, rigidly secured at or near their corners N, that the strain may be divided, substantially as and for the purpose set forth.

CYRUS W. SALADEE.

Witnesses:

HERM. LAUTEN,

P. F. LARNER.